(12) United States Patent
Derryberry

(10) Patent No.: US 6,626,543 B2
(45) Date of Patent: Sep. 30, 2003

(54) ELECTRONIC IMAGE PROJECTION DEVICE

(75) Inventor: Eddie W. Derryberry, Hudson, OH (US)

(73) Assignee: E-Lumen8, LLC, Hudson, OH (US)

( * ) Notice: Subject to any disclaimer, the term of this patent is extended or adjusted under 35 U.S.C. 154(b) by 0 days.

(21) Appl. No.: 09/880,682

(22) Filed: Jun. 13, 2001

(65) Prior Publication Data

US 2002/0030790 A1 Mar. 14, 2002

Related U.S. Application Data

(60) Provisional application No. 60/211,071, filed on Jun. 13, 2000.

(51) Int. Cl.$^7$ ............................................... G03B 21/14
(52) U.S. Cl. ........................................... 353/119; 353/71
(58) Field of Search ..................... 353/31, 119, 122; 349/5, 8, 9

(56) References Cited

U.S. PATENT DOCUMENTS

| | | |
|---|---|---|
| 4,749,364 A | 6/1988 | Arney et al. |
| 4,846,694 A | 7/1989 | Erhardt |
| 4,944,578 A | 7/1990 | Denison |
| 5,041,965 A | 8/1991 | Chen |
| 5,264,992 A | 11/1993 | Hogdahl et al. |
| 5,461,437 A | 10/1995 | Tanaka et al. |
| 5,477,284 A | 12/1995 | Taylor et al. |
| 5,483,250 A | 1/1996 | Herrick |
| 5,510,806 A | 4/1996 | Busch |
| 5,521,660 A | 5/1996 | Hodson et al. |
| 5,658,063 A | 8/1997 | Nasserbakht |
| 5,668,695 A | 9/1997 | Nakamura et al. |
| 5,703,624 A | 12/1997 | van Kruistum |
| 5,713,652 A * | 2/1998 | Zavracky et al. ........... 353/119 |
| 5,803,569 A | 9/1998 | Ma |
| 5,823,651 A | 10/1998 | Helot et al. |
| 5,828,427 A | 10/1998 | Faris |
| 5,865,522 A | 2/1999 | Gold |
| 6,023,254 A | 2/2000 | Johnson et al. |
| 6,028,649 A | 2/2000 | Faris et al. |
| 6,104,447 A | 8/2000 | Faris |
| 6,195,068 B1 * | 2/2001 | Suzuki et al. ................. 345/2.2 |
| 6,454,419 B2 * | 9/2002 | Kitazawa ..................... 353/122 |
| 2002/0036694 A1 * | 3/2002 | Merril ........................ 348/220 |

* cited by examiner

Primary Examiner—William Dowling
(74) Attorney, Agent, or Firm—Benesch, Friedlander, Coplan & Aronoff, LLP

(57) ABSTRACT

The present invention provides for an electronic image projection device having integrated computer capabilities built into the projector such that the data producing the projected image can be produced and retrieved without a separate, external, computing device. Alternatively, the present invention provides an electronic image projection device having the ability to removably mount a computing device (e.g. a laptop computer) in a manner that does not require numerous external cable connections or technical expertise.

12 Claims, 3 Drawing Sheets

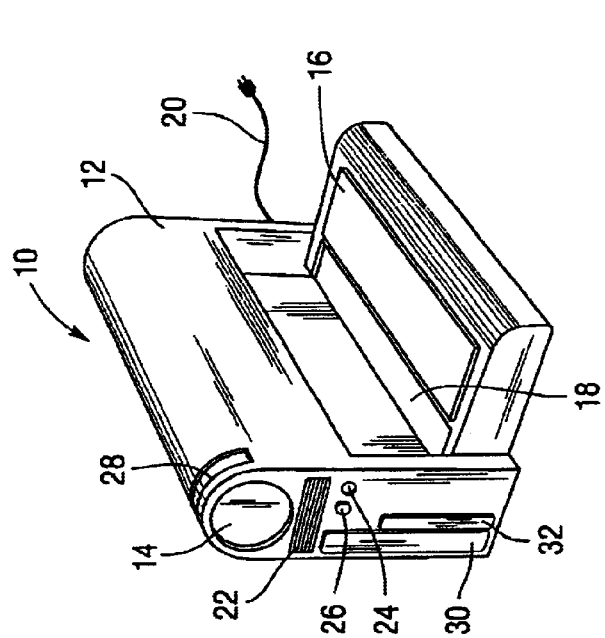
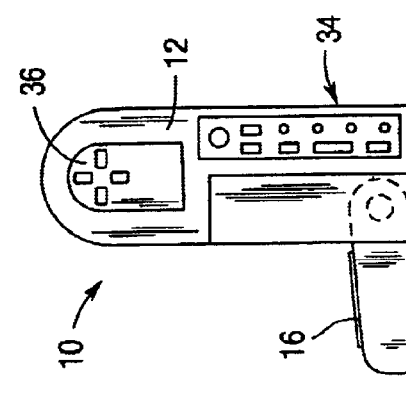
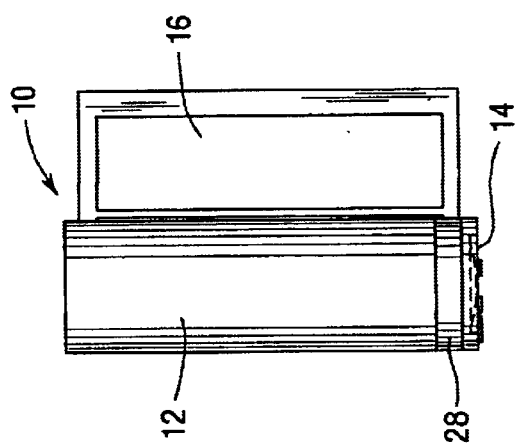
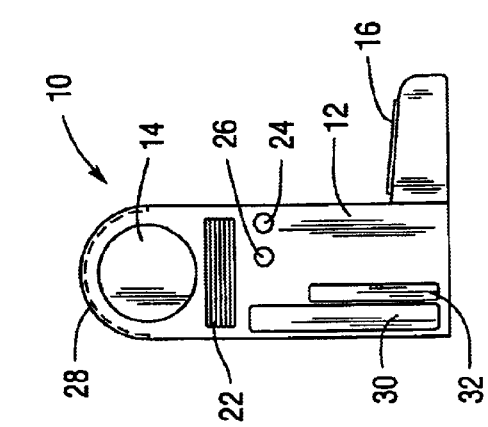
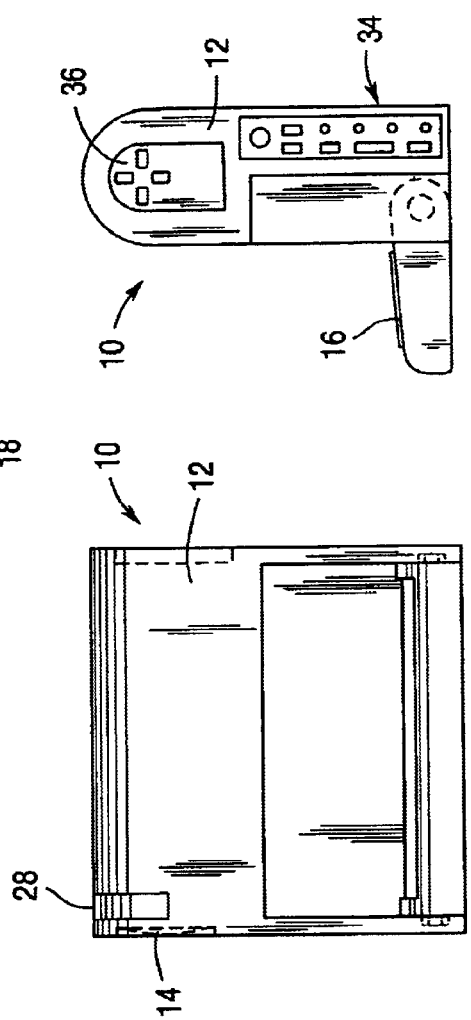

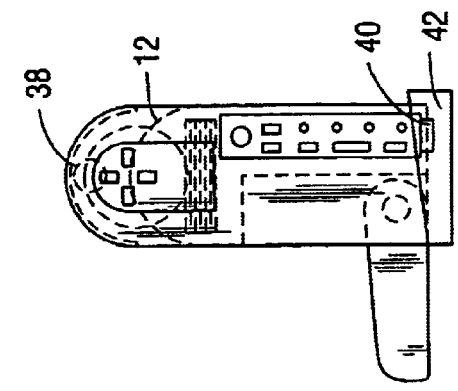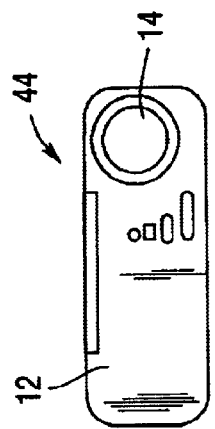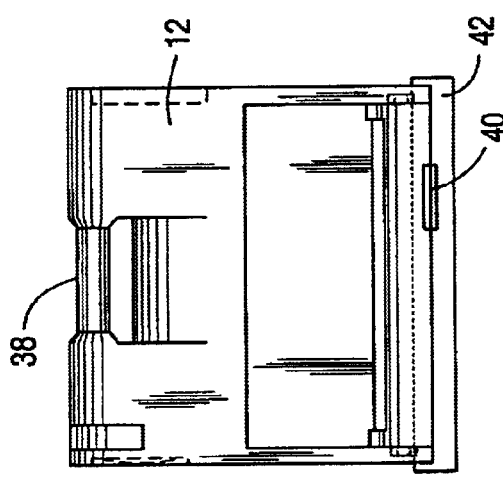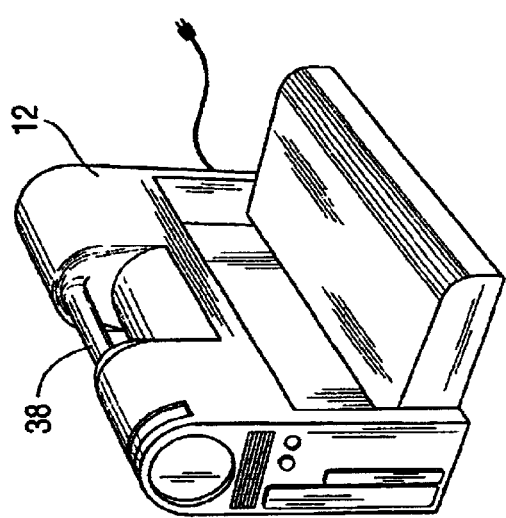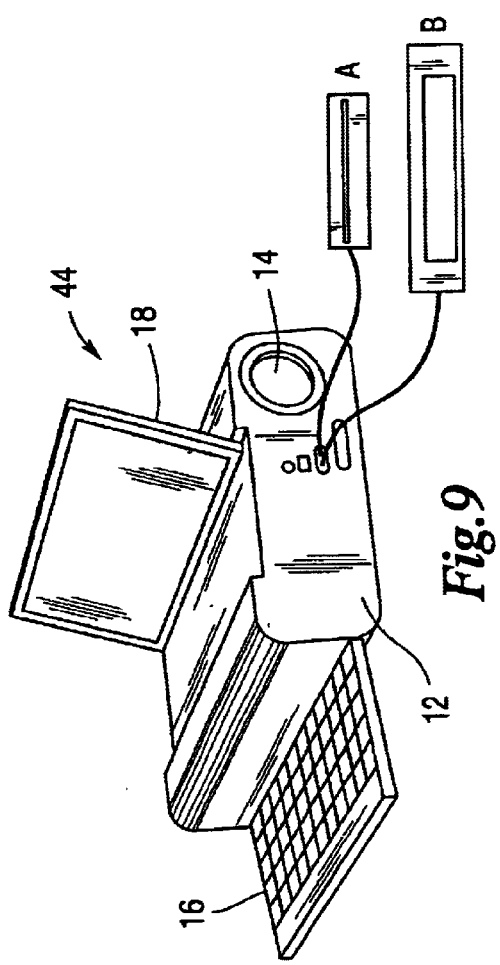

ELECTRONIC IMAGE PROJECTION DEVICE

CROSS-REFERENCE TO RELATED APPLICATIONS

This application claims the benefit of U.S. Provisional application Ser. No. 60/211,071 filed Jun. 13, 2000, which is herein incorporated by reference herein.

FIELD OF INVENTION

The present invention relates generally to an electronic image projection device, and more particularly to an electronic image projection device with integrated or removably mounted computer capabilities.

BACKGROUND OF THE INVENTION

On occasions such as seminars or presentations, it is often necessary to project information, data, or pictures for audience viewing hereinafter collectively referred to as information. Projectors manufactured today do not function as active electronic hubs, with functions that include computing, networking, data creation, retrieval and/or storage. Projectors today generally have limited or no type of built-in microprocessor or computing capability, but rather must rely upon the micro-processing capability of a computer, or some other source, to generate the source of the information to be projected. In order for the projector to display the required information, the projector must be joined via some means to a computer or other device containing the information to be projected. This is typically done with cables, but other connection means are possible; such as infrared or other forms of wireless capability well known in the art.

The conventional manner for the preparation and display of information is for the presenter, or other person, to prepare the information with a computer, either a desktop computer or portable laptop computer having, for example, PowerPoint™ capabilities. This information is then stored on a permanent drive within the computer, whether a hard drive, Omega Zip™ drive, other high-density disk media drive, CD ROM drive, or some other type of data storage device known in the art. And because the various brands and styles of electronic image projecting devices, referred to herein as "projectors," are sold as "stand-alone" passive presentation devices, the presenter will be required to externally connect the computer to the projector in order to display the information. This often requires the presenter to travel to and from the presentation with both the laptop computer and projector, articles that are often fragile, heavy, and cumbersome to transport.

As part of the presentation process, the presenter goes through the process of externally connecting the laptop computer to the projector via cable, infrared, or other means of wireless connectivity, which generally requires a certain amount of technical expertise. Any damage or misplacement of such connections often results in the inability to present the information. And because there is often little compatibility between laptop computers, projectors, and external connections, such technical difficulties often cannot be avoided by having additional external connections, parts, or expert assistance.

The presenter would "boot up" the laptop computer, activate the software program used for the presentation (e.g. PowerPoint™) and locate and execute the saved file containing the presentation. If more than one person were making presentations to a group, typically there would be long periods of time while each presenter is forced to go through the same routine.

There are numerous additional technical difficulties that can be encountered during the setting up and external connection of the projector and computer that may prevent the proper display of the presentation.

Therefore, there is constantly a need in the field of portable computers and projectors for a more efficient way to prepare and present information and to transport the equipment required for its display. There is also a constant need to provide equipment that is more reliable, easier to set up, and easier to use so that presentations can be prepared and given without technical difficulties.

SUMMARY OF THE INVENTION

An object of the present invention is to provide an electronic image projector having integrated computer capabilities built into the projector such that the information producing the projected image can be produced and retrieved without a separate, external, computing device. Alternatively, it is further an object of this invention to provide an electronic image projector having the ability to removably mount a computing device (e.g. a laptop computer) in a manner that does not require numerous external cable connections or technical expertise.

Particularly, the present invention provides for an electronic image projection device comprising a central processing unit for storing and processing information, means for inputting information into the central processing unit, display means electrically connected to the central processing unit for displaying inputted and processed information, and an electronic image projection means electrically connected to the central processing unit for projecting inputted and processed information onto a surface spaced a distance from the projection means. The present invention further provides for an electronic image projection device for use with a computing device having a computer housing and a display screen, wherein the projection device comprises a projector housing, an electronic image projection means located within the projector housing, and means for removably receiving at least a portion of the computer housing associated with the projector housing.

BRIEF DESCRIPTION OF THE DRAWINGS

FIG. 1 is a perspective view of a "stand up" model according to the first embodiment of the present invention, showing the projector with the keyboard rotated to the open position.

FIG. 2 is top plan view of the first embodiment of this invention.

FIG. 3 is front plan view of the first embodiment of this invention.

FIG. 4 is side view of the first embodiment of this invention.

FIG. 5 is rear view of the first embodiment of this invention.

FIG. 6 is a perspective view of an invention according to the first embodiment, further comprising a handle.

FIG. 7 is a side view of an invention according to the first embodiment, wherein the projector is connected to a network docking station.

FIG. 8 is a rear view of the invention of FIG. 7.

FIG. 9 is a perspective view showing a "lay-down" model of the invention according to the second embodiment of the invention.

FIG. 10 is a side view of the invention of FIG. 9 wherein the keyboard and display screen are in their closed positions.

DETAILED DESCRIPTION OF INVENTION

Figure 12:
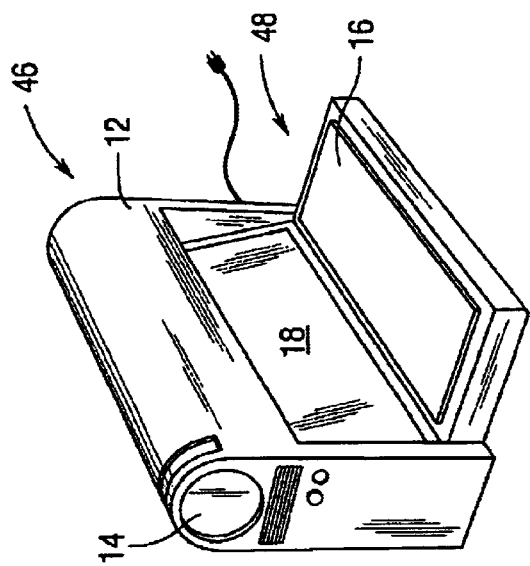
FIG. 12 is a perspective view of the invention of FIG. 11 wherein the computer device is mounted to the projector.

Generally, the present invention includes an electronic image projection device, generally referred to hereafter as "projector", having computer micro-processing capabilities. The disclosure herein describes the projector of this invention as utilizing such computer micro-processing capabilities incorporated into a single device, or in the alternative, as having removably mounted computer micro-processing capabilities (e.g. docking of a laptop computer). The operational hardware and software features utilized in the present invention, including the computer micro-processing means and electronic image projection means, are known in the art and will not be discussed herein.

The description of this invention is intended to fully describe the preferred and alternative embodiments and is not intended to limit the scope of this invention. One skilled in the art could envision numerous configurations for projectors having permanently integrated or removably mounted computer capabilities. Such configurations are believed to fall within the scope of this invention.

There are numerous capabilities and functions for projectors, computers, software applications, and hardware attachments that are known in the art. One skilled in the art would recognize that such capabilities and functions could be incorporated into this invention and still fall within the scope of the invention. Capabilities and functions known in the art which could be utilized with the present invention include, but are not limited to, the following:

- Input devices such as a keyboard, mouse, infrared, remote control device or microphones
- Displays such as liquid crystal displays (LCD), touch screen displays, projection displays, or other types of displays known in the art that display output from the computer
- Micro-processing capabilities to run various computer applications such as Microsoft PowerPoint™, Word™, Excel™ and other software
- Data storage and retrieval devices such as floppy disk drives, CD ROM drives, DVD drives, Omega Zip™ drives, or PCMCIA card or PC Flash Card
- Communication ports including parallel ports, serial ports, and USB ports that allow connection of various devices such as printers, scanners, video cameras, video cassette recorders, etc.
- Videoconferencing capabilities
- Internet connectivity using direct wire connection or wireless technology
- Telephone connectivity
- Battery operation capabilities for operating the computer without electrical power
- The projection device and/or the computer device could utilize speakers to present audio information The electronic image projection device of the first embodiment comprises a central processing unit for storing and processing information, means for inputting information into the central processing unit, display means electrically connected to the central processing unit for displaying inputted and processed information, and an electronic image projection means electrically connected to the central processing unit for projecting inputted and processed information onto a surface spaced a distance from the projection means.

As shown in FIGS. 1 through 5, the electronic image projection device of the first embodiment is generally referred to as projector 10. The projector 10 utilizes an integrated central processing unit for storing and processing information (not shown) and an electronic image projection means for displaying information (not shown) located within projector housing 12. The first embodiment of the present invention presents a "stand-up" projector 12.

With particular reference to FIG. 1, the projector 10 has a projector housing 12 including a projector lens 14, a keyboard 16, and a display screen 18. Although any means for inputting or modifying information within the central processing unit could be utilized, keyboard 16 of the preferred embodiment is described herein. Keyboard 16 can be attached to the projector housing in any suitable fashion. In the preferred embodiment, the keyboard 16 is mounted to one side of the projector housing 12 in a manner that allows the keyboard 16 to be accessible during use and stored away during non-use, such as through a protrusion-detent hinge construction. Therefore, the keyboard 16 can be flipped up within the housing 12 to protect the display screen 18 during non-use or transport of the device. During operation, the keyboard 16 can be flipped down to provide a work station wherein the keyboard 16 and display screen 18 are accessible for inputting and reviewing information. However, numerous configurations could be utilized to mount the keyboard to the projection housing in a flip down or non-flip down manner.

Projector 10 further includes a power cord 20 for supplying electrical power to the device. Alternatively, or in addition to, the CPU could utilize means for battery operation so that the computing device could be operated remotely from an electrical outlet. The projector 10 also includes typical features such as fan vent 22 for cooling the components located within the projector housing 12, power button 24, reset button 26, and focus control dial 28 for focusing the projected image. Projector 10 could also includes a CD-ROM drive 30, a floppy disk drive 32, and communication ports 34. Alternatively, or in addition thereto, other means for inputting information into the central processing unit known in the art could be used. Projector 10 also includes removably mounted remote control unit 36 shown in FIG. 5 for remotely controlling the projector functions and capabilities and a handle 38 for ease of transport.

In a related embodiment shown if FIGS. 6 through 8, the projector 10 could also include a handle 38 for ease of transport. It is preferred that the handle be integral with the projector housing 12, but other constructions could be used. As shown in FIGS. 7 and 8, the projector 10 could incorporate docking station connections 40 that could connect the projector 10 to a network docking station 42 or other networking device so that the presentation could be view remotely from the actual presentation.

The second embodiment of this invention, shown in FIGS. 9 and 10, provides an electronic image projection device generally referred to as projector 44. Projector 44 is generally similar to projector 10 of the first embodiment, but in a "lay-down" model. Therefore, similar elements found in both the first embodiment and the second embodiment are disclosed herein with similar reference numbers. The second embodiment likewise utilizes an integrated central processing unit for storing and processing information (not shown) and an electronic image projection means for displaying information (not shown) located within projector housing 12.

With particular reference to FIG. 9, the projector 44 has a projector housing 12 including a projector lens 14, a keyboard 16, and a display screen 18. In the present embodiment, keyboard is attached to the projector housing 12 is a slidably mounted fashion. Therefore, the keyboard 16 is mounted to the projector housing 12 in a manner that allows the keyboard 16 to be accessible during use and stored away during non-use. Display screen 18 is mounted to projector housing 12 in a hinged manner, such as a protrusion-detent connection. Therefore, the display screen 18 can be flipped up during operation to provide review of information and can be flipped down within the housing 12 to protect the display screen 18 during non-use or transport of the device. FIG. 9 also shows the connection of external devices A and B, which as explained above could be, among numerous external devices known in the art, an external DVD, CD-ROM, floppy disk drives or video camera or video recording device. However, numerous configurations of this device could be utilized according to the present embodiment.

Figure 13:
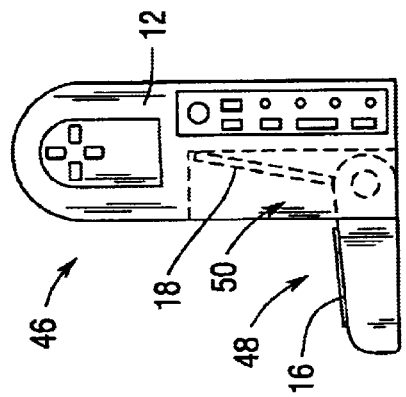
FIG. 13 is a side view of the invention shown in FIG. 12.
Figure 11:
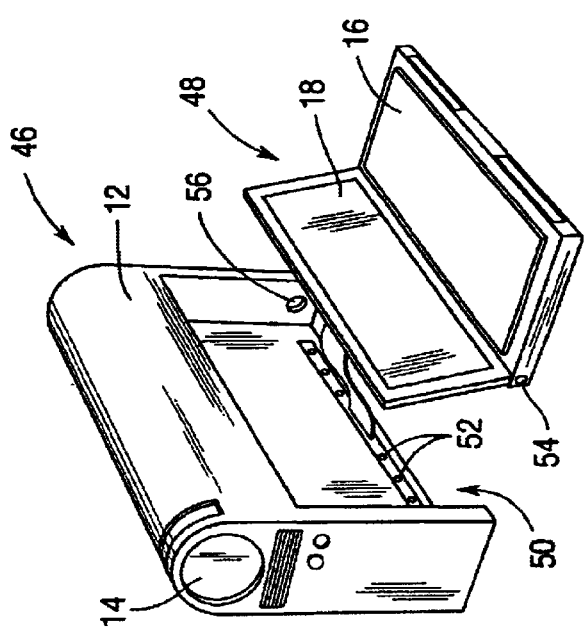
FIG. 11 is a perspective view of a projector having a removably mounted computer device according to the third embodiment of this invention, and showing the computer device in a disengaged position.

The third embodiment of this invention, shown in FIGS. 11 through 13, provides an electronic image projection device generally referred to as projector 46. Projector 46 generally provides a projector for use with a computing device, wherein the projector 46 includes means for removably receiving at least a portion of the external computer device housing. The third embodiment contains elements similar to the elements found in both the first and second embodiments and therefore is disclosed herein with similar reference numbers. The third embodiment thus includes an electronic image projection means for displaying information (not shown) located within projector housing 12, but relies upon the micro-processing capabilities of an external computing device (e.g. a laptop computer 48).

With particular reference to FIG. 11, the projector 46 has a projector housing 12 including a projector lens 14 and a means for removably mounting an external computing device, identified herein as a laptop computer 48. As shown in FIG. 11, the laptop computer 48 comprises a keyboard 16, a flip up display screen 18, and information storage and retrieval micro-processing capabilities (not shown). However, an external computer having numerous capabilities and constructions could be utilized within the scope of this invention.

Preferably, the laptop computer 48 is removably mounted to the projector 46 in a simple manner requiring little time, skill, and external connectors. The preferred method of removably mounting the laptop computer 48 to the projector 46 for both physical and electrical connection is for the projector 46 to serve as a docking station for the laptop computer 48. A docking station, as commonly known in the art today, would allow the laptop computer 48 to be quickly h linked to the projector 46 by sliding the laptop computer into a laptop receiving port 50 within the projector housing 12. The laptop receiving port 50 is specially designed with multi-function ports 52 extending therefrom to make electrical connection with the laptop computer. Therefore, the presenter would not have to identify ports and connect external cables in the difficult manner in which computers are connected to projectors today. Other types of hardware connection capabilities currently known in the arts could also be used in any number of other configurations.

In additional to the electrical connection made during the docking of the laptop computer 48 with the projector 46, the laptop computer 48 could be removably mounted to the projector 46 so that the projector 46 and laptop computer 48 are integrated such as in the first embodiment. Such a connection could be by a protrusion-detent connection, or other removably mounted connection, that would provide the laptop computer with a stable docking position within the projection device and permit it to function essentially as a single device. Protrusions 54 extending from the sides of the laptop computer 48 can be inserted into the notches 56 located in the front and rear walls of the projector housing 12. Other means of removably mounting the laptop or other computing device to the projector can be used including, but not limited to, docking station means, ball-detent means, or any other means known in the art. Numerous configurations of this device could be utilized according to the present embodiment.

The removable laptop computer 48 is removable by simply unplugging the communication ports or docking connector(s) located at the rear of the removable laptop computer from the communication ports or docking connector(s) located on the inside cavity 50 of the projector 46. Once the removable laptop computer 48 is removed from the projector 46, the projector 46 will only serve as a passive projecting device as the micro-processing capability resides within the removable laptop computer 48.

While the preferred and various embodiments of this invention have been disclosed, it should be understood that modifications and adaptations thereof could occur to persons skilled in the art. Other features and aspects of this invention will be appreciated by those skilled in the art upon reading and comprehending this disclosure. Such features, aspects, and expected variations and modifications of this invention are clearly within the scope of the invention where the invention is limited solely by the scope of the following claims.

Having thus defined the invention, I claim:

1. An electronic image projection device comprising:
   a projector housing;
   a projector located within said projector housing for projecting inputted and processed information onto a surface spaced a distance from said electronic image projection device;
   a central processing unit located within said projector housing;
   a keyboard for inputting information into said central processing unit, said keyboard connected to said projector housing and movable between an open and closed position; and
   an LCD display associated with said projector housing, accessible only when said keyboard is in said open position.

2. The electronic image projection device of claim 1 said device further comprising means for inputting information into said central processing unit, said means for inputting information into said central processing unit is chosen from the group consisting of a CD-ROM drive, a floppy disk drive, a digital video drive, an ethernet connection, a VCR drive, a phone line, an infrared connection, or a satellite connection.

3. The electronic image projection device of claim 1, further comprising a remote control for remotely operating said device.

4. The electronic image projection device of claim 1, further comprising a video camera electrically connected to said projector, thereby allowing said projection device to project images received from said video camera.

5. The electronic image projection device of claim 1, wherein said device is connectable to a network docking station to permit transmission of information therebetween.

6. The electronic image projection device of claim 1, further comprising an audio output mechanism.

7. A computer and electronic image projection device assembly comprising:

an electronic image projection device comprising:

a projector housing;

an electronic image projection mechanism located within said projector housing for projecting information from the projection device onto a surface spaced a distance from said projection device; and a computer device comprising:

a computer housing;

a central processing unit for processing information located within said computer housing;

means for inputting information into said central processing unit located within said computer housing; and a display screen mounted to said computer housing for displaying information, wherein said projector housing further comprises a docking station for removably electrically and physically receiving said computer device, and the projected information from the projection device projects directly onto the surface independent of the display screen.

8. An integrated computer and electronic image projection device of claim 7, wherein said projector housing further comprises a video camera connected thereto and electrically connected to said image projection means, thereby allowing said projection device to project images received from said video camera.

9. An image projection device comprising:

a computing device located within a projector housing;

a display screen associated with the projector housing, the display screen being in data communication with the computing device;

an image projector associated with the projector housing, the image projector configured to project light along a path to a surface distant from the image projection device, where the path excludes the display screen; and a keyboard movable between two positions relative to the display screen, a first position permitting user access to the keyboard and visual access to the display screen and a second position obstructing user access to the keyboard and visual access to the display.

10. The image projection device as set forth in claim 9, where the projector housing comprises a handle suitable to carry the device.

11. The image projection device as set forth in claim 9, further comprising:

a memory in data communication with the computing device for storing information.

12. The image projection device as set forth in claim 9, further comprising:

an input in data communication with the computing device for selectively providing information to the computing device.

\* \* \* \* \*